United States Patent [19]

Stuart

[11] Patent Number: 4,790,133
[45] Date of Patent: Dec. 13, 1988

[54] HIGH BYPASS RATIO COUNTERROTATING TURBOFAN ENGINE

[75] Inventor: Alan R. Stuart, Boston, Mass.

[73] Assignee: General Electric Company, Cincinnati, Ohio

[21] Appl. No.: 166,749

[22] Filed: Mar. 10, 1988

Related U.S. Application Data

[63] Continuation of Ser. No. 902,259, Aug. 29, 1986, abandoned.

[51] Int. Cl.[4] .............................................. F02K 3/072
[52] U.S. Cl. .................................... 60/226.1; 60/268; 60/39.162; 415/65; 416/129
[58] Field of Search ...................... 60/226.1, 262, 268, 60/39.162; 416/128, 129; 415/65

[56] References Cited

U.S. PATENT DOCUMENTS

| | | |
|---|---|---|
| 2,360,130 | 10/1944 | Heppner . |
| 2,404,767 | 7/1946 | Heppner . |
| 2,430,399 | 11/1947 | Heppner . |
| 2,478,206 | 8/1949 | Redding . |
| 2,608,821 | 9/1952 | Hunsaker . |
| 2,702,985 | 3/1955 | Howell . |
| 2,812,898 | 11/1957 | Buell . |
| 3,153,907 | 10/1964 | Griffith . |
| 3,363,831 | 1/1968 | Garnier ............................ 415/65 |
| 3,385,064 | 5/1968 | Wilde et al. .................... 60/226.1 |
| 3,391,540 | 7/1968 | Bauger et al. .................. 60/226.1 |
| 3,448,582 | 6/1969 | Bracey et al. ................. 60/39.162 |
| 3,524,318 | 8/1970 | Bauger et al. .................. 60/226.1 |
| 3,620,009 | 11/1971 | Wilde ............................ 60/226.1 |
| 3,620,021 | 11/1971 | Lawrie . |
| 3,673,802 | 7/1972 | Krebs et al. ..................... 60/262 |
| 3,861,139 | 1/1975 | Jones ............................ 60/226.1 |
| 3,897,001 | 7/1975 | Heimintoller, Jr. et al. ... 239/265.13 |
| 4,159,624 | 7/1979 | Gruner ............................. 60/268 |
| 4,192,137 | 3/1980 | Chappell et al. ............... 60/39.161 |
| 4,327,548 | 5/1982 | Woodward ....................... 60/229 |
| 4,463,553 | 8/1984 | Boudignes ....................... 60/268 |

FOREIGN PATENT DOCUMENTS

| | | |
|---|---|---|
| 586560 | 3/1947 | United Kingdom . |
| 620721 | 3/1949 | United Kingdom . |
| 765915 | 1/1957 | United Kingdom . |
| 774502 | 5/1957 | United Kingdom . |
| 1069033 | 5/1967 | United Kingdom . |
| 1206469 | 9/1970 | United Kingdom . |
| 2099082 | 12/1982 | United Kingdom . |
| 2129502 | 5/1984 | United Kingdom ............. 60/39.162 |

OTHER PUBLICATIONS

Jet Propulsion Turbojets, by Volney C. Finch (Millbrae, Calif., The National Press, 9/1948, title page, p. iii, and pp. 296 to 304).

*Primary Examiner*—Donald E. Stout
*Attorney, Agent, or Firm*—Derek P. Lawrence

[57] ABSTRACT

A gas turbine engine comprising a core gas generator engine for generating combustion gases, an additional power turbine, an additional fan section, and a booster compressor is disclosed. The power turbine includes first and second counterrotatable turbine blade rows effective for rotating first and second drive shafts, respectively. The fan section includes a first fan blade row connected to the first drive shaft and a second fan blade row connected to the second drive shaft. The booster compressor includes a first compressor blade row connected to the first drive shaft and a second compressor blade row connected to the second drive shaft.

8 Claims, 1 Drawing Sheet

U.S. Patent  Dec. 13, 1988  4,790,133

HIGH BYPASS RATIO COUNTERROTATING TURBOFAN ENGINE

This is a continuation of application Ser. No. 902,259, filed Aug. 29, 1986, now abandoned.

This invention relates to gas turbine engines and, more particularly, to a turbofan engine with a counterrotating low pressure system.

BACKGROUND OF THE INVENTION

This invention is related to patent application Ser. No. 437,923, Johnson, now abandoned, and its c-i-p application Ser. No. 728,466, now abandoned, both to the assignee of the present invention, the disclosures of which are both hereby incorporated by reference.

The Johnson application discloses a counterrotating turbofan driven by a counterrotating power turbine. a feature of the Johnson application is the configuration of the power turbine and the ratio of the mean flowpath radius of such turbine to the mean flowpath radius of the gas generator. This is required in part to ensure lower fan tip speed and/or higher turbine blade speed.

Under certain design conditions, it may be desirable to reduce the mean flowpath radius of the power turbine. According to an embodiment shown in Johnson, such a reduction in the mean flowpath radius of the power turbine would increase the fan tip speed thereby reducing the efficiency of the engine.

OBJECTS OF THE INVENTION

It is an object of the present invention to provide a new and improved high bypass ratio counterrotating turbofan engine.

It is another object of the present invention to provide a new and improved turbofan engine with a counterrotating booster compressor.

It is yet another object of the present invention to provide a new and improved turbofan engine with a forward mounted counterrotating fan and booster compressor driven by two counterrotating shafts.

SUMMARY OF THE INVENTION

In accordance with the present invention, a gas turbine engine is disclosed. The engine comprises a gas generator effective for generating combustion gases, a power turbine, a fan section, and a booster compressor. The power turbine includes first and second counterrotatable blade rows effective for rotating first and second drive shafts, respectively. The fan section includes a first fan blade row connected to the first drive shaft and a second fan blade row connected to the second drive shaft. The booster compressor includes a first compressor blade row connected to the first drive shaft and a second compressor blade row connected to the second drive shaft.

DETAILED DESCRIPTION OF THE INVENTION

Figure 1:
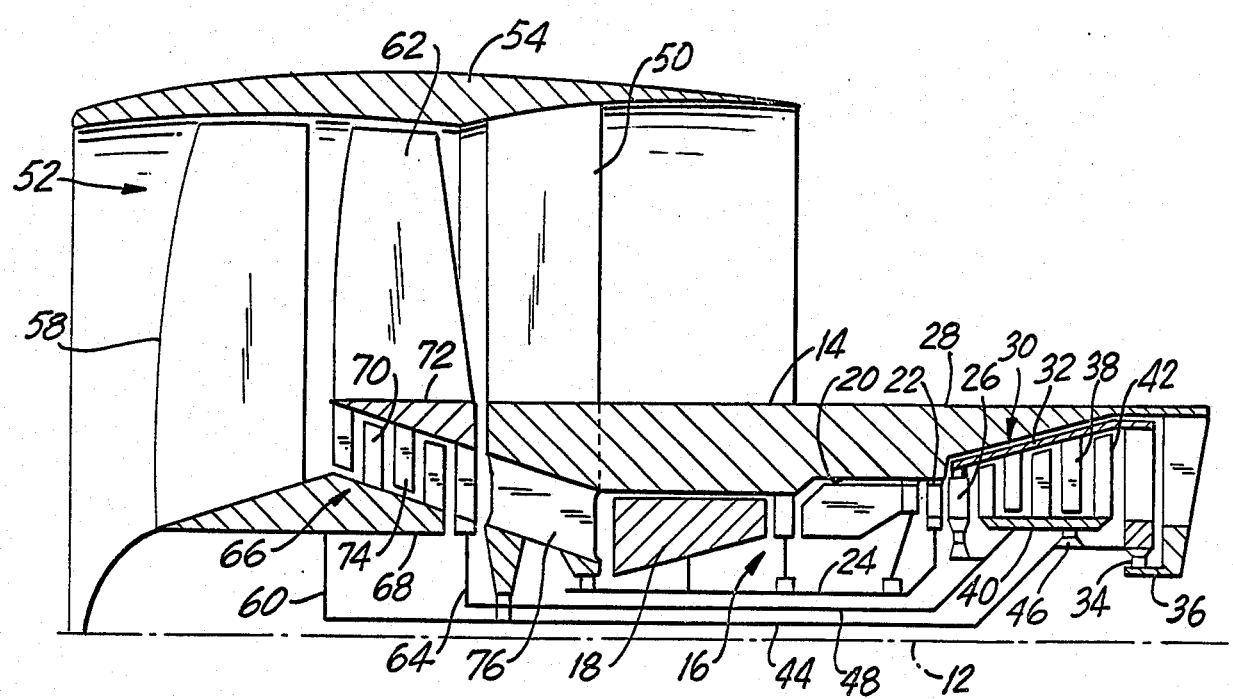
FIG. 1 is a schematic view of a high bypass ratio counterrotating turbofan engine according to one form of the present invention.

FIG. 1 shows a gas turbine engine 10 according to one embodiment of the present invention. Engine 10 includes a longitudinal center line axis 12 and an annular casing 14 disposed coaxially about axis 12. Engine 10 also includes a core gas generator engine 16 which includes a compressor 18, a combustor 20, and a high pressure turbine 22, either single or multiple stage, all arranged coaxially about the longitudinal axis or center line 12 of engine 10 in serial, axial flow relationship. An annular drive shaft 24 fixedly interconnects compressor 18 and high pressure turbine 22.

The gas generator 16 is effective for generating combustion gases. Pressurized air from compressor 18 is mixed with fuel in combustor 20 and ignited, thereby generating combustion gases. Some work is extracted from these gases by high pressure turbine 22 which drives compressor 18. The remainder of the combustion gases are discharged from the gas generator 16 through strut 26 of support member 28 and into power turbine 30.

Power turbine 30 includes a first annular drum rotor 32 rotatably mounted by suitable bearings 34 to frame hub member 36. First rotor 32 includes a plurality of first turbine blade rows 38 extending radially inwardly therefrom and axially spaced.

Power turbine 30 also includes a second annular drum rotor 40 disposed radially inwardly of first rotor 32 and first blade rows 38. Second rotor 40 includes a plurality of second turbine blade rows 42 extending radially outwardly therefrom and axially spaced. Second rotor 40 is rotatably mounted to first shaft 44 by differential bearings 46.

Each of the first and second turbine blade rows 38 and 42 comprises a plurality of circumferentially spaced turbine blades, with the first blade rows 38 interdigitated and alternately spaced with respective ones of the second blade rows 42. Combustion gases flowing through the blade rows 38 and 42 drive first and second rotors 32 and 40 in counterrotating directions. The rotors rotate at substantially the same speed.

Fixedly attached to first and second rotors 32 and 40 are first and second drive shafts 44 and 48, respectively. Thus, first and second rotors 32 and 40 are effective for driving first and second drive shafts 44 and 48 respectively. Drive shafts 44 and 48 are coaxially disposed relative to center line 12 of engine 10 and extend forward through gas generator 16.

Engine 10 further comprises a forward fan section 52. Fan section 52 is disposed radially inwardly of annular fan duct 54 which is suitably secured by strut 56 to casing 14. Fan section 52 includes a first fan blade row 58 connected to the forward end 60 of first drive shaft 44. Similarly, fan section 52 includes a second fan blade row 62 connected to the forward end 64 of second drive shaft 48.

Each of the first and second fan blade rows 58 and 62 comprises a plurality of circumferentially spaced fan blades. Fan blade rows 58 and 62 are counterrotating which provides a relatively high fan efficiency and propulsive efficiency with generally low absolute tip speed on each fan blade row. The fan blade rows 58 and 62 extend radially outwardly to the fan duct 54.

It should be appreciated that the counterrotating fan blade row 62 serves to remove the swirl or circumferential component of air imparted by the counterrotating fan blade row 58. In this way struts 56 is not an outlet guide vane in the sense that no swirl need be taken out by the struts. Therefore only a relatively small number of struts 56 are required to support duct 54.

The struts 56 are positioned axially forward of the core engine 20. This allows support of the engine 10 at a location as close to fan blade rows 58 and 62 as possible.

Engine 10 further comprises a booster compressor 66. Booster compressor 66 includes a first annular rotor 68 including a plurality of first compressor blade rows 70 extending radially outwardly therefrom and axially spaced. Booster compressor 66 also includes a second annular rotor disposed radially outwardly of rotor 68 and first compressor blade rows 70. Rotor 72 includes a plurality of second compressor blade rows 74 extending radially inwardly therefrom and axially spaced. Rotor 68 is fixedly attached to fan blade row 58 and a forward end 60 of first drive shaft 44. Similarly, rotor 72 is fixedly attached to fan blade row 62 and the forward end 64 of second drive shaft 48.

Each of the first and second compressor blade rows 70 and 74 comprises a plurality of circumferentially spaced compressor blades, with the first blade rows 70 alternately spaced with respective ones of the second blade rows 74. Compressor blade rows 70 and 74 are counterrotating and located in the core duct 76 leading into compressor 18 of gas generator 16.

The counterrotating booster compressor 66 provides a significant pressure rise to air entering the core gas generator 16. An advantage of having the fan blade row and the compressor blade rows driven by the same drive shaft is that energy is optimally extracted from power turbine 30. Without the booster compressor stages being driven by the power turbine from shafts 44 and 48, a separate compressor with an additional shaft and drive turbine would be required. Furthermore, if the booster compressor stages were non-existent, the engine would be limited in overall pressure ratio resulting in poorer efficiency. The rotating booster gives sufficient pressure rise despite the slow fan speed. By having compressor blade rows 70 and 74 counterrotating, a lesser number of compressor blade rows than that required for a single low speed compressor driven from only one shaft is possible.

Figure 2:
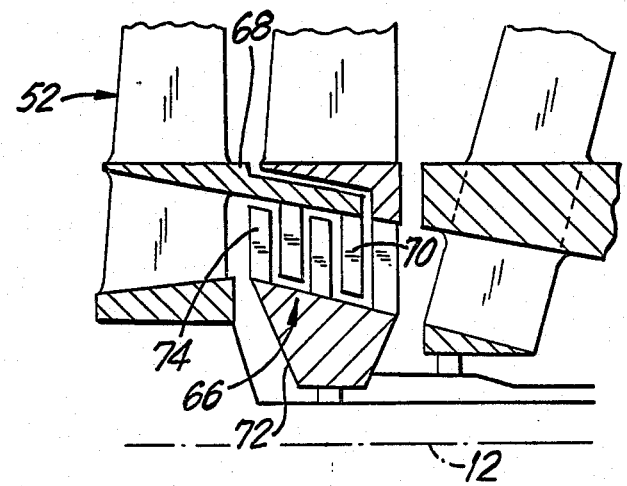
FIG. 2 is a schematic view of a booster compressor for a high bypass ratio turbofan engine according to another form of the present invention.

FIG. 2 shows an alternative embodiment of fan section 52 and booster compressor 66. Booster compressor 66 is configured so that rotor 68 is disposed radially outwardly from rotor 72. Thus, first compressor blade rows 70 extend radially inwardly from rotor 68 and compressor blade rows 74 extend radially outwardly from rotor 72.

It will be clear to those skilled in the art that the present invention is not limited to the specific embodiments illustrated herein.

It should be appreciated that in the present engine 10 there is basically a separate core engine 20 in the center with two counter rotating turbines at one end and two counterrotating fans at the other end. The counterrotating turbines and fans are not intermingled with the center core engine.

In order to achieve thrust reversal, a standard thrust reversal unit can be included in the system. Alternately, a variable pitch mechanism can be provided, as is known in the art, and incorporated within the system.

It will be understood that the dimensions and proportional and structural relationships shown in the drawings are illustrated by way of example only and those illustrations are not to be taken as the actual dimensions or proportional structural relationships used in the counterrotating turbofan engine of the present invention.

Numerous modifications, variations, and full and partial equivalents can be undertaken without departing from the invention as limited only by the spirit and scope of the appended claims.

What is claimed and desired to be secured by Letters Patent of the United States is the following:

1. A gas turbine engine comprising:
    a unitary gas generator effective for generating combustion gases;
    a counterrotatable power turbine completely aft of said gas generator including first and second interdigitated counterrotatable turbine blade rows effective for rotating first and second drive shafts, respectively;
    a counterrotatable fan section completely forward of said gas generator including a first fan blade row connected to said first drive shaft and a second fan blade row connected to said second drive shaft; and
    a counterrotatable booster compressor completely forward of said gas generator including a first compressor blade row connected to said first drive shaft and a second compressor blade row interdigitated with said first compressor blade row and connected to said second drive shaft, whereby each turbine row of the first and second turbine blade rows respectively drives both a fan blade row and a compressor blade row.

2. A gas turbine engine comprising:
    a gas generator including a core compressor, combustor, and turbine in serial flow relationship effective for generating combustion gases;
    an annular casing disposed coaxially about a center line of said engine;
    a counterrotatable power turbine including first and second interdigitated counterrotatable turbine blade rows effective for rotating first and second drive shaft, respectively;
    a counterrotatable fan section disposed within an annular fan duct, said fan section including a first fan blade row connected to said first drive shaft and a second fan blade row connected to said second drive shaft and located axially aft of said first row, each row comprising a plurality of blades extending until proximate said fan duct, said fan section being effective to produce a fan flow; and
    a counterrotatable booster compressor including a first compressor blade row connected to said first drive shaft and a second compressor blade row interdigitated with said first blade row and connected to said second drive shaft, whereby each turbine row of the first and second turbine blade rows respectively drives both a fan blade row and a compressor blade row,
    wherein said gas generator is a separate unit from said lower turbine, fan section, and booster compressor and wherein said gas generator in non-interdigitated with said fan section, booster compressor, or power turbine.

3. A gas turbine engine, as recited in claim 2 further comprising:
    a strut securing said duct to said casing and positioned axially forward of said core compressor.

4. A gas turbine engine, as recited in claim 2, wherein said first and second counterrotatable turbine blade rows, said fan blade rows, and said compressor blade rows all rotate at substantial equal speeds.

5. A gas turbine engine comprising:
- a gas generator effective for generating combustion gases;
- a counterrotatable power turbine including a first rotor having a plurality of first turbine blade rows extending radially inwardly therefrom and a second rotor having a plurality of second turbine blade rows extending radially outwardly therefrom, said first and second turbine blade rows alternating with each other and being interdigitated, said first and second turbine rotors being counterrotatable and effective for driving first and second drive shafts, respectively;
- a counterrotatable fan section including a first fan blade row connected to said first drive shaft and a second fan blade row connected to said second drive shaft; and
- a counterrotatable booster compressor including a first compressor blade row connected to said first drive shaft and a second compressor blade row interdigitated with said first blade row and connected to said second drive shaft, whereby each turbine row of the first and second turbine blade rows respectively drives both a fan blade row and a compressor blade row,
- wherein said gas generator is a separate unit from said power turbine, fan section, and booster compressor and wherein said gas generator is non-interdigitated with said fan section, booster compressor, or power turbine.

6. A gas turbine engine comprising:
- a gas generator effective for generating combustion gases;
- a counterrotatable power turbine including a first turbine rotor having a plurality of first turbine blade rows extending radially inwardly therefrom and a second turbine rotor having a plurality of second turbine blade rows extending radially outwardly therefrom, said first and second turbine rotors being counterrotatable and effective for driving first and second drive shaft, respectively;
- a counterrotatable fan section including a first fan blade row connected to said first drive shaft and a second fan blade row connected to said second drive shaft; and
- a counterrotatable booster compressor including a first compressor rotor connected to said first drive shaft having a plurality of first compressor blade rows extending radially outwardly therefrom, and a second compressor rotor connected to said second drive shaft having a plurality of second compressor blade rows extending radially inwardly therefrom,
- wherein said gas generator is a separate unit from said power turbine, fan section, and booster compressor and wherein said gas generator in non-interdigitated with said fan section, booster compressor, or power turbine.

7. A gas turbine engine, as recited in claim 6, wherein said second fan blade row is located axially aft of said first fan blade row, said fan section being effective to produce a fan flow.

8. A gas turbine engine, as recited in claim 6, wherein said first and second drive shafts rotate at approximately the same speeds and said counterrotatable power turbine, said counterrotatable fan section and said counterrotatable booster compressor also rotate at substantially said same speed.

* * * * *